United States Patent [19]

Huignard

[11] 4,306,763

[45] Dec. 22, 1981

[54] OPTICAL SOURCE COMPRISING A SEMICONDUCTOR LASER AND OPTICAL MEANS FOR THE ANAMORPHOSIS OF THE BEAM EMITTED BY SAID LASER

[75] Inventor: Jean-Pierre Huignard, Paris, France

[73] Assignee: Thomson-CSF, Paris, France

[21] Appl. No.: 56,085

[22] Filed: Jul. 9, 1979

[30] Foreign Application Priority Data

Jul. 10, 1978 [FR] France .................... 78 20541

[51] Int. Cl.³ ............................................. G02B 5/32
[52] U.S. Cl. .................................. 350/3.72; 350/162 R
[58] Field of Search ...................... 350/3.7, 3.72, 3.8, 350/162 R; 250/552

[56] References Cited

U.S. PATENT DOCUMENTS

| | | | |
|---|---|---|---|
| 3,628,849 | 12/1971 | Wibert | 350/162 |
| 3,894,789 | 7/1975 | Kobayashi et al. | 350/96.18 |
| 3,930,728 | 1/1976 | Pieuchard et al. | 350/3.7 |
| 3,985,443 | 12/1976 | Danielsson et al. | 350/162 R |

FOREIGN PATENT DOCUMENTS 2524643  1/1976  Fed. Rep. of Germany ... 350/162 R
2824094 12/1978  Fed. Rep. of Germany ..... 350/3.72

OTHER PUBLICATIONS

IBM Technical Disclosure Bulletin, vol. 15, No. 7, (Dec. 1972), pp. 2082–2083, "Reducing Beamspread in Junction Lasers".
Dahlbacka et al., "Off-Plane Stigmatic Imaging with Sperical Concave Gratings: Experimental Verification", Applied Optics, vol. 16, No. 2, Feb. 1977.

*Primary Examiner*—John K. Corbin
*Assistant Examiner*—Bruce Y. Arnold
*Attorney, Agent, or Firm*—Cushman, Darby & Cushman

[57] ABSTRACT

An optical source comprising a semiconductor laser having an emissive junction and optical means for the anamorphosis of the beam emitted by said laser. The optical means comprise a concave holographic diffraction grating. The location of the recording sources of said grating and of the semiconductor laser and their wavelength are such that said grating makes a stigmatic image of said laser with a good aplanetism. The angle of diffraction is selected so as to reduce the non-isotropy of the beam emitted by the semi-conductor laser.

11 Claims, 13 Drawing Figures

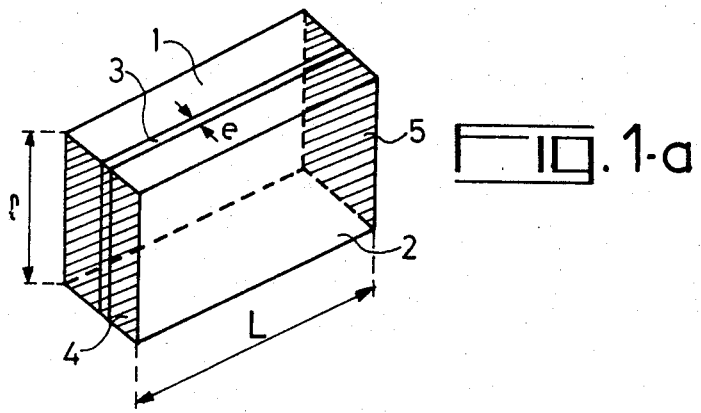
FIG. 1-a
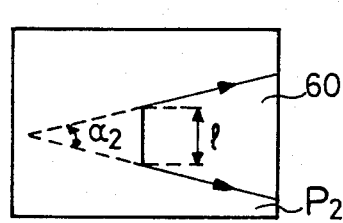
FIG. 1-b
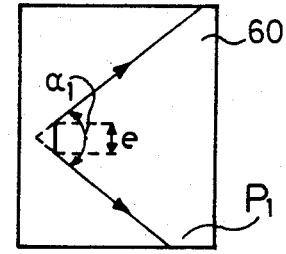
FIG. 1-c
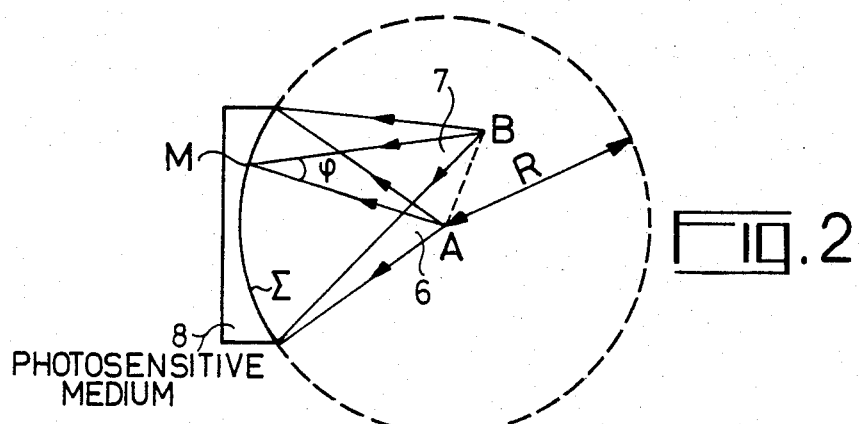
FIG. 2

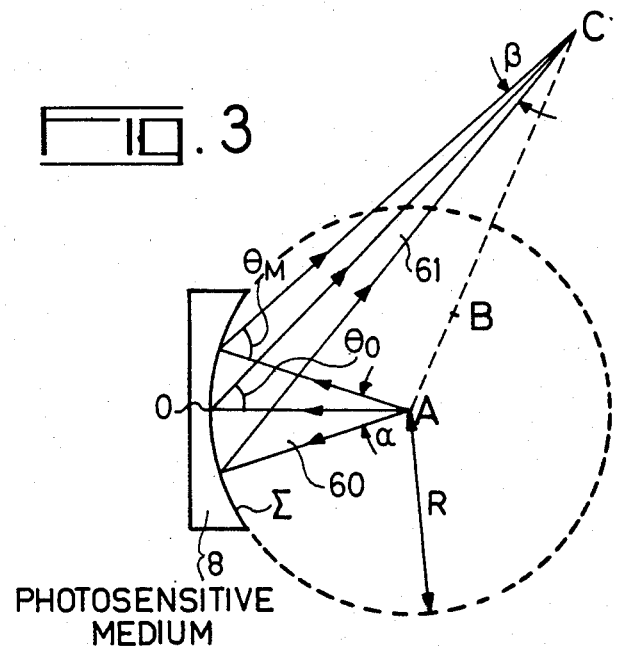
FIG. 3
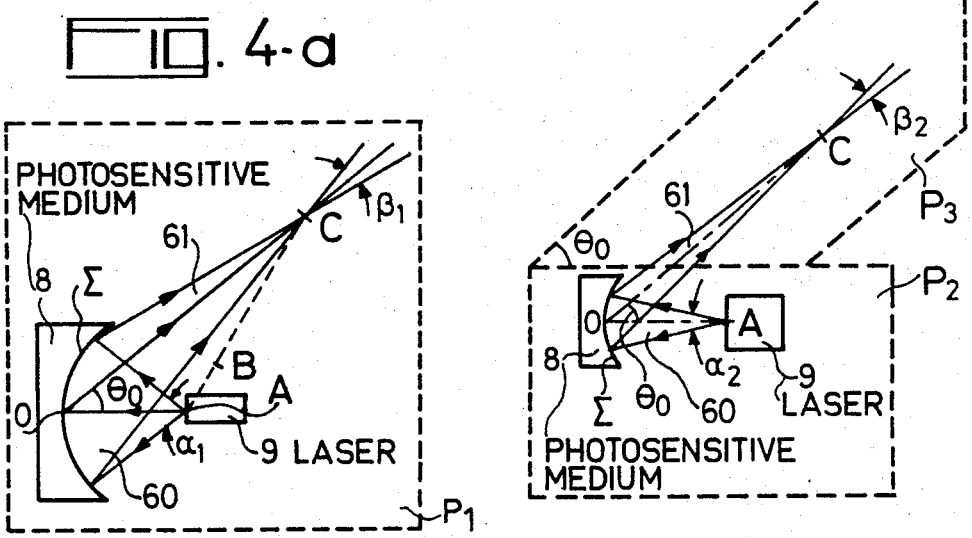
FIG. 4-a
FIG. 4-b

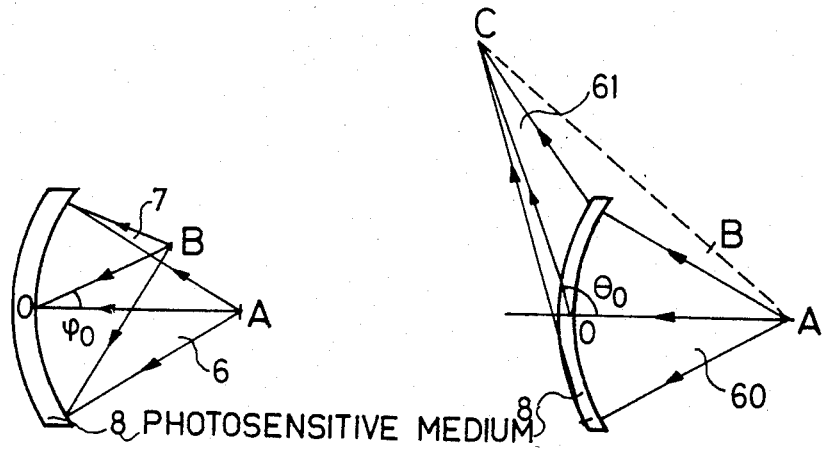
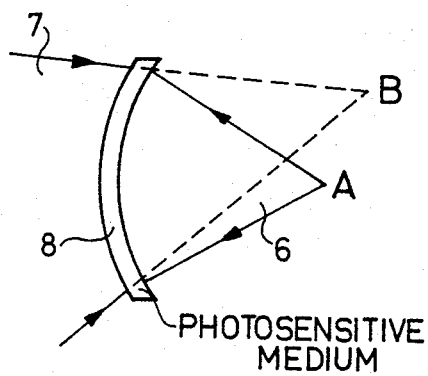
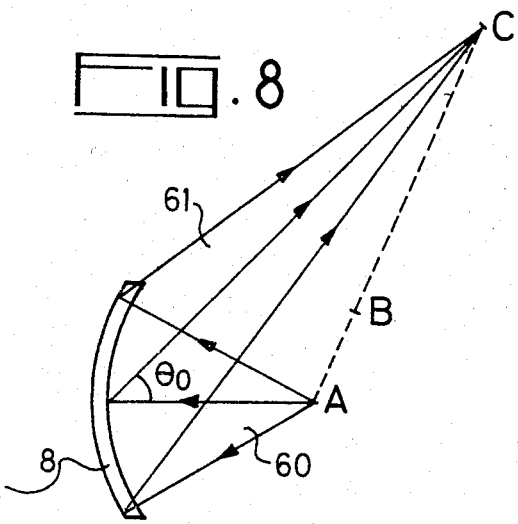
FIG. 5  FIG. 6  FIG. 7  FIG. 8

OPTICAL SOURCE COMPRISING A SEMICONDUCTOR LASER AND OPTICAL MEANS FOR THE ANAMORPHOSIS OF THE BEAM EMITTED BY SAID LASER

The invention relates to sources of optical radiation including a semiconductor laser and means permitting anamorphosis of the beam emitted by this laser.

It is necessary, in many optical applications, such as the storage of optical information, or visual display, to provide a coherent light beam radiating uniformly in all directions in order to obtain accurate focussing on a light-sensitive support. Semiconductor lasers, such as AsGa lasers, are being used increasingly as radiation sources on account of their simplicity of use and their low cost. Now, the values of the angles of emission of semiconductive layers in different planes vary very greatly. The anisotropy of their radiation patterns is bound up with the cross-section of the optical emissive cavity whose thickness is very small in relation to its width. Whence the need to modify the solid angle in which the radiaion is contained by associating with the laser source optical means such as to reduce the difference between the radiation angles in two normal planes intersecting at the emission axis of the junction.

Different structures designed to achieve this result are already known: some use conventional optical structures with spherical and cylindrical surfaces which anamorphose the radiation in one plane and not in the other; but these structures do not make it possible to obtain perfect stigmatism. In the case of application to coupling in an optical fibre, the use of a "selfoc" lens associated with a cylindrical lens has been proposed; the problems of adjustment are, in this case, difficult to overcome as there is no aplanatism, and stigmatism is not obtained either.

An object of the present invention is to provide a single solution to the problem with a single component by simplifying the problem of adjustment and ensuring, whatever the aperture of the optical system, that the image of the source produced by the component proposed emits a beam with a pre-determined axis comparable to that of a beam with a uniform radiation angle produced by a pin-point source. The invention makes use of the stigmatic and aplanatic properties of concave holographic gratings which, under conditions relating to the recording and reconstruction wavelengths and to the location of the recording sources, enable the beam emitted by the laser source to be diffracted with a change of radiation angles by conjugating the laser source with an exit pupil.

The invention will be more readily understood and other features will become apparent by means of the following description and the accompanying figures, wherein:

FIGS. 1a, 1b and 1c illustrate the radiation properties of a semiconductor junction;

FIG. 2 shows the recording of a thin concave holographic grating;

FIG. 3 shows the reconstruction of the grating recorded as shown in FIG. 2;

FIGS. 4a and 4b illustrate the application of the properties of the concave gratings to the anamorphosis of a light beam;

FIG. 5 shows the recording of a transmission volume holographic grating;

FIG. 6 shows the reconstruction of the hologram recorded as shown in FIG. 5;

FIG. 7 shows the recording of a reflection volume holographic grating;

FIG. 8 shows the reconstruction of the hologram recorded as shown in FIG. 7;

Figure 9:
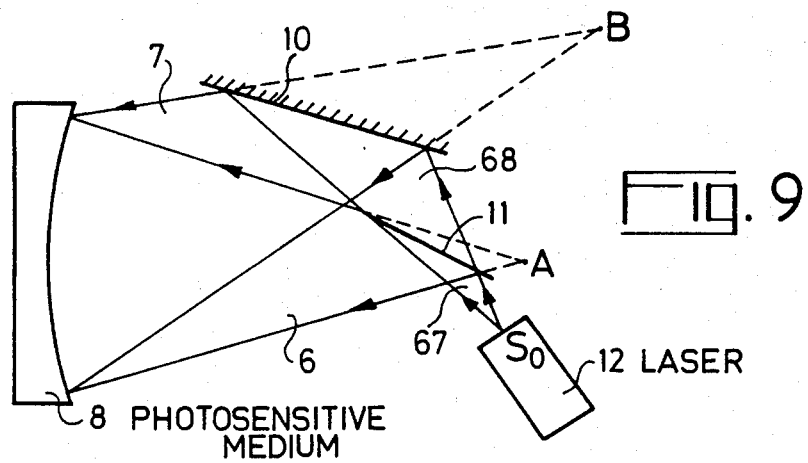
FIG. 9 shows an example of the formation of two recorded beams.

FIG. 1a shows a semiconductor laser. It includes an "n" type semiconductor layer, 1, and a "p" type semiconductor layer, 2, separated by a junction 3. The laser is produced by forming a Perot-Fabry cavity directly on the junction by suitably cutting away the semiconductor. The reflecting faces of the cavity are the transverse faces, 4 and 5, the distance between which is a length L which is the length of the junction. One of the faces 4 emits coherent radiation with a wavelength $\lambda$. The emission surface obtained is rectangular since the thickness, e, of the junction is less than its width 1. The diffraction pattern of the source obtained is not a circle. The radiation pattern of the junction in the plane $P_2$ of the junction is shown in FIG. 1b. If the emitted beam 60 is assumed to be single-mode, the angle of emission in this plane is $\alpha_2$ and the laws of diffraction give tg $\alpha_2 = \pi/1$. The radiation pattern of the junction in the plane $P_1$ normal to the junction is given in FIG. 1c. The angle of emission is $\alpha_1$, the laws of diffraction give tg $\alpha_1 = a/e$. For example, a gallium arsenide laser emits radiation with a wavelength of $\lambda = 0.9$ $\mu$m; and it was possible to measure $\alpha_1 = 60°$ and $\alpha_1 = 20°$. The difference between the angles in the two planes is therefore very large. If the emitted radiation is multi-mode, the difference is even greater. The object of the invention is to reduce this difference as far as possible by using the stigmatic properties of the concave holographic gratings.

FIG. 2 shows the formation of a holographic grating obtained in a photosensitive medium 8 by recording the interference fringes of two spherical light waves, 6 and 7, emitted respectively from two coherent point sources A and B, which are in phase, have the same wavelength $\lambda_0$, and illuminate medium 8. The value of the wavelength $\lambda_0$ is selected from the range of wavelengths to which medium 8 is sensitive with a high degree of resolution. The face $\Sigma$ of the medium exposed to waves 6 and 7 is a spherical surface with a radius R and a centre A, that is to say in the location of one of the two recording sources. As the waves which interfere are spherical, the spacing of the interference fringes is not constant over the entire surface: in the vicinity of any point M on surface $\Sigma$ the spacing between two successive fringes is equal to $\lambda_0/(\sin \phi)$, $\phi$ being the angle of the radii AM and BM which interfere at M.

When the medium 8 is a thin layer (its thickness is in the order of magnitude of the wavelength $\lambda_0$), the recorded grating is almost two-dimensional and called "thin hologram". This is true when a light ray illuminating such a hologram encounters only one interference fringe. Furthermore, whatever the thickness of medium 8, the properties of a thin hologram are obtained by covering the recorded medium 8, which presents a relief modulation, with a thin metallic layer, which has the effect of making the grating reflecting and of masking the thickness of the layer.

FIG. 3 shows the reconstruction of a grating recorded on the medium 8 by the light waves 6 and 7, as shown in FIG. 2, then developed, the surface Σ then being metallized. The reconstruction source is placed at point A, that is to say in the location of one of the recording sources. This source emits a beam 60 with a wavelength λ which is diffracted with reflection by the grating into several beams having different directions according to the diffraction orders. Only the order 1 beam, referenced 61 is shown. It has been demonstrated by Jobin-Yvon in the "Handbook on diffraction gratings" that a stigmatic image of the point A is obtained at a point C such that B and C are in harmonic division with the sphere having a radius R and a centre A, provided that division ratio is equal to the ratio of the wavelengths λ and $\lambda_0$, that is to say that $AB.AC=R^2$; $m=R/AB=AC/R$; $\lambda=m\lambda_0$ for the +1 order beam 61. For a beam of any order number K, the condition is then $\lambda=(m\lambda_0)/K$. m being fixed by the choice of λ and $\lambda_0$, the locations of points B and C satisfying the conditions $AB=R/m$ and $AC=mR$ are respectively two spheres having their centres at A and a radius R/m and mR. With A, B, C aligned, the position of point B determines that of point C. Furthermore, the choice of the position of point B determines, on one hand, the diffraction plane defined by the line 0A, which is the axis of the beam from A, and by the line AB and, on the other hand, the angle of diffraction $\theta_M$ at any point M on the surface Σ, in particular the angle $\theta_0$ at the point 0: The position of B determines the angle of the rays AM and BM, hence the spacing $p=(\lambda_0)/(\sin \phi)$ about the point M, thus the angle of diffraction $\theta_M=$ arc sinc λ/p. With the radiation-angle of the beam 60 in the plane of the figure that contains the points 0, A, B, C equal to α, it is possible, by means of simple geometrical and trigonometrical calculations, to determine the value of the radiation-angle of beam 61 in the plane of the figure, β, as a function of $\theta_0$ and α. When is calculated for two different values of α: $\alpha_1$ and $\alpha_2$, the ratio of the two corresponding values of β, $\beta_1$ and $\beta_2$, is far smaller than the ratio $\alpha_1/\alpha_2$. The values $\beta_1$ and $\beta_2$ are, moreover, closer together the greater the angle $\theta_0$. These properties have been stated, for the purpose of simplification, for the plane of the figure containing the rays emitted by A and the corresponding diffracted rays. They still apply when the rays emitted and diffracted are not in the plane of vectors 0A anmd BC. Reference is still being made to the same angle $\theta_0$ between 0A and 0C.

FIGS. 4a and 4b illustrate the application of the properties of the concave holographic gratings described above when the source emitting the beam 60 is a laser source 9 such as that represented in FIG. 1a. The source 9 with a wavelength λ is placed at the point A. The image of the source 9 is formed at C. FIG. 4a is a cross-section in the plane 0AC, as in the case of FIG. 2. It is assumed, without this limiting the invention, that this plane is plane $P_1$ normal to the junction, that is to say the plane of FIG. 1c. The radiation-angle of the beam 60 from source 9 is then $\alpha_1$, whose typical value is 60°. The image of A formed at C constitutes a secondary source point which emits a beam 61 whose radiation-angle in the plane of the figure is $\beta_1$; if $\alpha_1=60°$ and, for example, $\theta_0=55°$, the value of $\beta_1$ is approximately 13°. FIG. 4b is a cross-section in a plane $P_2$ normal to the previous one and which is the plane of the junction. The section of the beam 60 through this plane containing the axial ray 0A is diffracted to form a beam located in a plane $P_3$ containing the ray 0C and forming an angle $\theta_0$ with the plane $P_2$. Plane $P_3$ is also normal to plane $P_1$. The radiation angle of beam 60 in plane $P_2$ is $\alpha_2$, whose typical value is 20°. The radiation-angle of the beam 61 in plane $P_3$ is then $\beta_2$ which, if $\theta_0=55°$, has an approximate value of 8.5°. It is observed that, for this value of $\theta_0=55°$, the values $\beta_1$ and $\beta_2$ are much closer to one another (in a ratio of 1.5) than those of $\alpha_1$ and $\alpha_2$ (in a ratio of 3). It now remains to specify the recording conditions that enable this result to be obtained. It is easily demonstrated that the angle $\theta_0=55°$ is obtained for an angle of approximately 110° between 0A and AB. Current photosensitive media are sensitive to the wavelengths of conventional gas laser sources. If one selects $\lambda_0=454$ nm, which is the wavelength of the blue ray of an argon laser, in the case of a semiconductor AsGA laser whose wavelength is $\lambda=900$ nm, the ratio m is approximately equal to 2: $AB=R/2$ and $AC=2R$. The value of R does not affect the properties of the device; R can be chosen in the order of one cm, which forms a system of a few cm² in surface area. The value of λ is given by way of example. It depends on the source used to form the source points A and B. The value $\theta_0$ given above is not limitative. The higher this value, the greater is the resolution of the system, but then the diffraction efficiency in a given order, i.e. the power of the source created at C, decreases. The value of 55° seems to be a good compromise.

As the energy of the incident wave is distributed by diffraction in the different orders, only a fraction of this energy can be recovered at C. This distribution of energy depends on the response of the photosensitive medium 8. When the hologram is formed by a sinusoidal relief modulation, each of the +1 order beam and the −1 order beam contains approximately 33% of the energy. Certain mediums have a non-linear response, with the result that the modulation recorded (relief or index) does not follow the distribution of interference intensity. This applies to "photo-resist" material whose square-wave response enables an efficiency of approximately 40% to be obtained in the +1 order beam.

In order to obtain better diffraction efficiency, hence greater power for the order 1 beam, it is preferable to use the hologram recorded on all three of its dimensions, dispensing with metallization, and suitably selecting the thickness of layer 8. The volume holograms are governed by Bragg's Law. This law determines the angle of incidence of the reconstruction beam giving maximum diffraction efficiency when the reconstruction wavelength and the spacing of the grating are determined. When deviating from the value of the angle of incidence given by Bragg's Law, efficiency decreases. By selecting a layer thickness that is not too great (a few tens of the wavelength) a medium whose index modulation is large, and a grating spacing which is not too small, it is possible to maintain good diffraction efficiency in a fairly large range of angles. For example, a layer formed of dichromated gelatin with a thickness of approximately ten microns recorded with a recording wavelength of approximately 0.45 μm (in the blue) gives a phase holographic grating whose spacing is about 0.2 μm with an index variation of approximately 10% from one stratum to the next one. With a reconstruction wavelength of approximately 0.9 μm (red or infrared), it is possible to reach a diffraction efficiency close to 100% in the beam whose order number is +1 for a radiation angle equal to 60°.

Depending on the mode of recording, the hologram can be transmissive or reflecting. FIG. 5 shows the recording of a transmission hologram which is a volume hologram but whose thickness is maintained within the limits defined above.

The recording sources A and B are located on the same side in relation to layer 8 and beams 6 and 7 with a wavelength $\lambda_0$ are divergent beams emitted from points A and B. This situation leads to the formation of scattering surfaces in layer 8 which, throughout the zone of the layer, are oriented along the bisecting line of the rays emitted from A and B incident in this zone, that is to say quite close to the lines normal to the layer. The reconstruction of the hologram is shown in FIG. 6. The light rays with a wavelength of $\lambda$ emitted from a source placed at A are reflected by the scattering surfaces at an angle $\theta$ which depends on the direction of the incident rays but which, according to the direction of the scattering surfaces, is always greater than 90°, with the result that the grating is transmissive.

The conditions of stigmatism for the image C of the source A, which have been exposed above, for a thin hologram remain true for a volume hologram which is not very thick (about ten microns thick). Thus, points A, B, C are in harmonic division in relation to the circle with its centre at A and a radius R on which photosensitive layer 8 is placed: $R/AB = AC/R = m$, with $m = \lambda/\lambda_0$.

FIG. 7 shows the recording of a reflecting volume hologram whose thickness is maintained within the limits defined above. In order to obtain a reflecting grating, the recording must be carried out with two beams 6 and 7 illuminating either side of photosensitive layer 8. For example, the beam 6, emitted from point A, is a divergent beam, while beam 7 is a beam from the other side of layer 8 in relation to point A and converging towards point B, which is virtual, being located on the same side as A. The scattering surfaces, which are orientated along the bisecting lines of the radii of the two beams, tend to lie in a direction at a tangent to the layer. The reconstruction is shown in FIG. 8. The rays emitted from the source located at A are reflected by the scattering surfaces at an angle $\theta$ of less than 90°, with the result that the grating is reflective. The conditions of stigmatism are the same as before: the image of A is formed at C if $R/AB = AC/R = m$, m being the ratio of the recording and reconstruction wavelengths.

The recording of a grating on light-sensitive layer 8, whatever the type of system, requires two light beams, 6 and 7, of the same wavelength and in phase, hence, generally, originating from a single laser source. An example of a device forming these two beams is shown in FIG. 9. This device is suitable for recording a transmission grating (or metallized thin grating which is reflective, but is, intrinsically, a transmission grating). A device of the same type could easily be designed to obtain a reflection grating. The optical configuration shown in FIG. 9 is very simple. A laser source, 12, for example an argon laser, emits a light beam 67 with a wavelength of $\lambda_0$ from a point source $S_0$. A semi-transparent plate, 11, separates this beam 67 into a reflected beam 6 and a transmitted beam 68 which is, itself, reflected by a mirror 10 to form a beam 7. The reflection factor of plate 68 is selected as a function of that of mirror 10 so as to obtain preferably two beams 6 and 7 of equal intensity. The image of $S_0$ reflected by plate 11 is a virtual image located at point A. The image of $S_0$ reflected by mirror 10 is a virtual image located at point B. Beams 6 and 7, which are designed to be in phase and have the same wavelength $\lambda_0$, can form interference fringes in medium 8.

Figure 10:
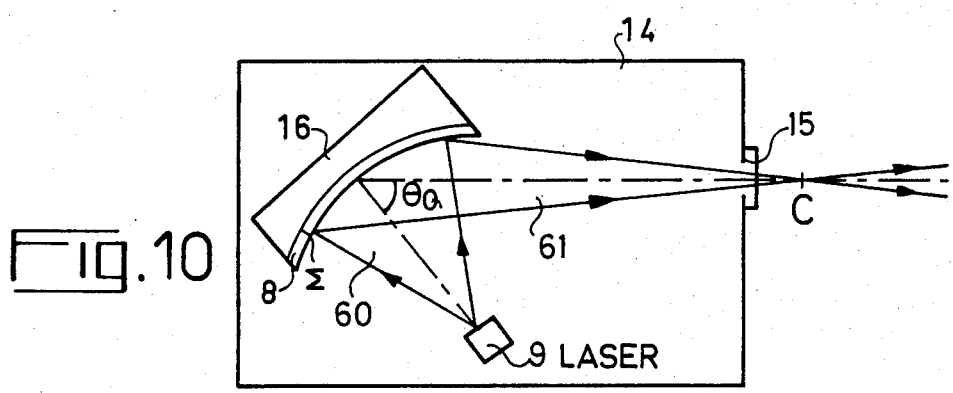
FIG. 10 represents a source according to the invention.

As photosensitive layer 8 is, generally, only a few $\mu m$ thick, it is deposited on a support which, in the preceding figures, has not been illustrated. For the purpose of reconstruction by reflection (metallized grating or intrinsically reflection grating), this support has not to have good optical properties. It must simply have a concave face, which is easy to provide. The desired photosensitive medium is then deposited on this face. For the purpose of reconstruction by transmission, it is preferable to have a transparent support, glass for example, that is sufficiently thin to avoid disturbing substantially the path of the light rays. As in FIGS. 3 to 8, R is about one cm, the surface $\Sigma$ is about a few cm$^2$ and the greatest distance, AC, is about a few cm, the different elements constituting the source formed in this way can be contained in a small housing. FIG. 10 illustrates a complete source according to the invention. In housing 14 is placed a support, 16, one of whose faces, $\Sigma$, is a spherical surface having a radius R, concave and covered by a photo-sensitive layer, 8, previously recorded and developed so as to form a holographic grating, according to a configuration such as those shown in FIGS. 2, 5, 7. Housing 14 also contains a semiconductor laser, 9, whose dimensions can be very small, placed in the same way, in relation to layer 8, as one of the recording sources. In order to obtain a precise location, it may be necessary to provide mechanical means to make the support 6 integral and, for example, a support for the laser 12, comprising a precise point of reference constituting point A discussed above, this same point of reference having been used for recording. The beam 60 emitted by laser 9 and diffracted by layer 8 is focussed at a point C. A transparent window, 15, is provided in the opaque wall of housing 14 in order to permit the passage of diffracted beam 61, in the vicinity of point C which constitutes the exit pupil of the source. Means can be provided for adjusting the laser 9-support 16 unit in order to align point C exactly in window 15 without modifying the respective positions of source 9 and support 16. The source comprised in housing 14 has an exit pupil C which emits a beam almost isotropic, having a wavelength $\lambda$ equal to that of laser 9 and whose energy can range from 30% to almost 100% of that of the laser 9.

What is claimed is:
1. Optical source having an exit pupil, comprising:
a semiconductor laser having an emissive junction emitting a non-isotropic beam of coherent radiation of wavelength $\lambda$; and
optical means for anamorphosing said beam, said optical means comprising a concave holographic diffraction grating arranged along a spherical surface the concavity of which is oriented towards said emissive junction; said grating conjugating the center of said emissive junction with a predetermined point C which is the center of said exit pupil, said grating being obtained in a photosensitive layer with first and second recording beams of coherent radiation of wavelength $\lambda_0$ having spherical wavefronts.

2. Optical source as claimed in claim 1, wherein said first beam converges in the centre A of said spherical surface and said second beam converges in a point B distinct from A.

3. Optical source as claimed in claim 2, wherein the centre of said emissive junction is located in said centre A, aligned with points B and C, whose positions satisfy $R/AB = AC/R = m$, m being equal to $k\lambda/\lambda_0$, k being the diffraction order nomber of the diffracted beam converging in C and R being the radius of said spherical surface.

4. Optical source as claimed in claim 3, wherein k=1.

5. Optical source as claimed in claim 3, wherein said grating is formed by a relief modulation in said photosensitive layer.

6. Optical source as claimed in claim 5, wherein said photosensitive layer is made of photoresist.

7. Optical source as claimed in claim 5, wherein said surface is covered with a metallic layer rendering said surface reflective.

8. Optical source as claimed in claim 3, wherein said grating is formed by a refraction index modulation in said photosensitive layer.

9. Optical source is claimed in claim 8, wherein said photosensitive layer is made of dichromated gelatin.

10. Optical source as claimed in claim 5 or 8, wherein said first and second recording beams illuminate the same side of said spherical surface, so that said grating is reflective.

11. Optical source as claimed in claim 5 or 8, wherein said second recording beam illuminates the convex side of said spherical surface, so that said grating is transmissive.

* * * * *